United States Patent
Totale et al.

(10) Patent No.: US 11,768,677 B2
(45) Date of Patent: *Sep. 26, 2023

(54) METHOD AND SYSTEM FOR SOFTWARE APPLICATION OPTIMIZATION USING NATURAL LANGUAGE-BASED QUERIES

(71) Applicant: OPEN TEXT CORPORATION, Waterloo (CA)

(72) Inventors: Sachin Gopaldas Totale, Pleasanton, CA (US); Harkirat Singh Lamba, Delhi (IN); Deepali Kishnani, Delhi (IN); Pulkit Manocha, Delhi (IN); Samir Yasin Vaidya, Bangalore (IN); Roshan Prakash Salvi, Bangalore (IN)

(73) Assignee: OPEN TEXT CORPORATION, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/750,601

(22) Filed: May 23, 2022

(65) Prior Publication Data
US 2022/0283800 A1     Sep. 8, 2022

Related U.S. Application Data

(63) Continuation of application No. 17/121,176, filed on Dec. 14, 2020, now Pat. No. 11,372,637, which is a (Continued)

(51) Int. Cl.
*G07F 17/30* (2006.01)
*G06F 9/445* (2018.01)
(Continued)

(52) U.S. Cl.
CPC ............. *G06F 8/70* (2013.01); *G06F 8/36* (2013.01); *G06F 8/65* (2013.01); *G06F 16/24522* (2019.01); *G06F 16/24575* (2019.01)

(58) Field of Classification Search
CPC ............. G06F 8/70; G06F 16/24522; G06F 16/24575; G06F 8/36; G06F 8/65; G06F 11/1474; G06F 9/466
See application file for complete search history.

(56) References Cited

U.S. PATENT DOCUMENTS

| | | | | |
|---|---|---|---|---|
| 8,838,579 | B2 * | 9/2014 | Weyerhaeuser | .... G06F 16/2453 |
| | | | | 707/718 |
| 10,152,508 | B2 * | 12/2018 | Weissman | ........... G06F 16/2462 |

OTHER PUBLICATIONS

Choudhary et al., Impact of intellisense on the accuracy of Natural Language Interface to Database, 5 pages (Year: 2015).*

* cited by examiner

*Primary Examiner* — Thuy Dao
(74) *Attorney, Agent, or Firm* — SPRINKLE IP LAW GROUP (57) ABSTRACT

A method for software application optimization using natural language-based queries. The method includes obtaining a user-provided query. The user-provided query includes a constraint to be used for an identification of an application element that matches the constraint, from a set of application elements of a software application. The user-provided query is a string that includes a human language sentence. The method further includes deriving a formalized query from the user-provided query by translating the user-provided query into a syntactic construct of segmented sentence elements and obtaining the application element that matches the constraint. Obtaining the application element that matches the constraint includes deriving a pattern representation of the user-provided query from the formalized query and identifying the application element that matches the pattern representation of the user-provided query from the plurality of application elements.

20 Claims, 6 Drawing Sheets

Related U.S. Application Data continuation of application No. 16/228,173, filed on Dec. 20, 2018, now Pat. No. 10,884,730, which is a continuation of application No. 14/970,259, filed on Dec. 15, 2015, now Pat. No. 10,191,734.

(51) Int. Cl.
*G06F 9/455* (2018.01)
*G10L 15/02* (2006.01)
*G06F 8/70* (2018.01)
*G06F 16/2452* (2019.01)
*G06F 16/2457* (2019.01)
*G06F 8/36* (2018.01)
*G06F 8/65* (2018.01)

```
<output>                                                    562
  <queries>
    <query>
      <selectfeatures>
        <action>
          <select>select</select>
        </action>
        <featurerow>
          <featurecolumn>
            <feature>
              <id>label</id>
            </feature>
          </featurecolumn>
        </featurerow>
      </selectfeatures>
      <fromartifacts>
        <from>from</from>
        <adjective/>
        <artifacts>
          <pages>Pages</pages>
        </artifacts>
      </fromartifacts>
      <inproject/>
      <whereconditions/>
      <semicolon>;</semicolon>
      <comments>
        <comment/>
      </comments>
    </query>
  </queries>
</output>
```

FIG. 5A

```
                                                            564
package uitemplate import "http://www.emc.com/xcp2/2010/uitemplate"

pattern label_pages(p: Page, l) = {
        Page.label(p,l);
}
```

METHOD AND SYSTEM FOR SOFTWARE APPLICATION OPTIMIZATION USING NATURAL LANGUAGE-BASED QUERIES

CROSS-REFERENCE TO RELATED APPLICATIONS

This application is a continuation of, and claims a benefit of priority under 35 U.S.C. 120 of the filing date of U.S. patent application Ser. No. 17/121,176, filed Dec. 14, 2020, issued as U.S. Pat. No. 11,372,637 entitled "METHOD AND SYSTEM FOR SOFTWARE APPLICATION OPTIMIZATION USING NATURAL LANGUAGE-BASED QUERIES," which is a continuation of, and claims a benefit of priority under 35 U.S.C. 120 of the filing date of, Ser. No. 16/228,173, filed Dec. 20, 2018, now U.S. Pat. No. 10,884,730, entitled "METHOD AND SYSTEM FOR SOFTWARE APPLICATION OPTIMIZATION USING NATURAL LANGUAGE-BASED QUERIES," which is a continuation of, and claims a benefit of priority under 35 U.S.C. 120 of the filing date of, U.S. patent application Ser. No. 14/970,259 filed Dec. 15, 2015, now U.S. Pat. No. 10,191,734, entitled "METHOD AND SYSTEM FOR SOFTWARE APPLICATION OPTIMIZATION USING NATURAL LANGUAGE-BASED QUERIES," the entire contents of which are hereby expressly incorporated by reference for all purposes.

BACKGROUND

A software application that executes on a computing device includes application elements such as, for example, data structures, documents, access control lists, user profiles, etc. The number of application elements may increase and interdependencies between application elements may become increasingly complex with increasing software application size. Once the software application reaches a certain size, it may be challenging to maintain and update the application elements of the software application.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods and systems enabling a business consultant, application developer, administrator, etc. to maintain and update a software application, regardless of the complexity of the software application. The software application may be, for example, an enterprise content management (ECM) or an enterprise resource planning (ERP) system, where complexity may increase with increasing size of the software application, for example, due to an increasing number of application elements and interdependencies of these application elements.

An application element, in accordance with one or more embodiments of the technology is a single unit of code which describes a single object, e.g., a document, an access control list (ACL), a user, a user group, or any other type of object, that is part of the software application.

In one or more embodiments of the technology, a software application needs to be reviewed and/or maintained. Maintenance may be necessary to resolve issues and/or to accommodate new features. Maintenance may include, for example, the removal of unused application elements such as, for example, pages that have been created but that are never accessed, unused pick lists, menus, etc. Such elements may unnecessarily consume resources. Further, attributes of application elements may need to be inspected for validity (e.g., range, format, etc.), application elements may need to be updated, errors in the application elements, such as name conflicts, attributes without default values, etc., may need to be detected and corrected, etc. Those skilled in the art will appreciate that these are merely examples for required maintenance. After the identification of application elements that require maintenance, suitable corrections may be made. For example, outdated links may be replaced by valid links.

Without performing above-described maintenance, a software application may have or, over time, develop design issues that may result in poor performance and/or malfunctions.

Because manual identification of application elements that require maintenance, is impractical or even impossible, once the software application reaches a certain size, a tool that facilitates, accelerates and/or improves the detection of application elements that require maintenance is therefore desirable.

Figure 1:
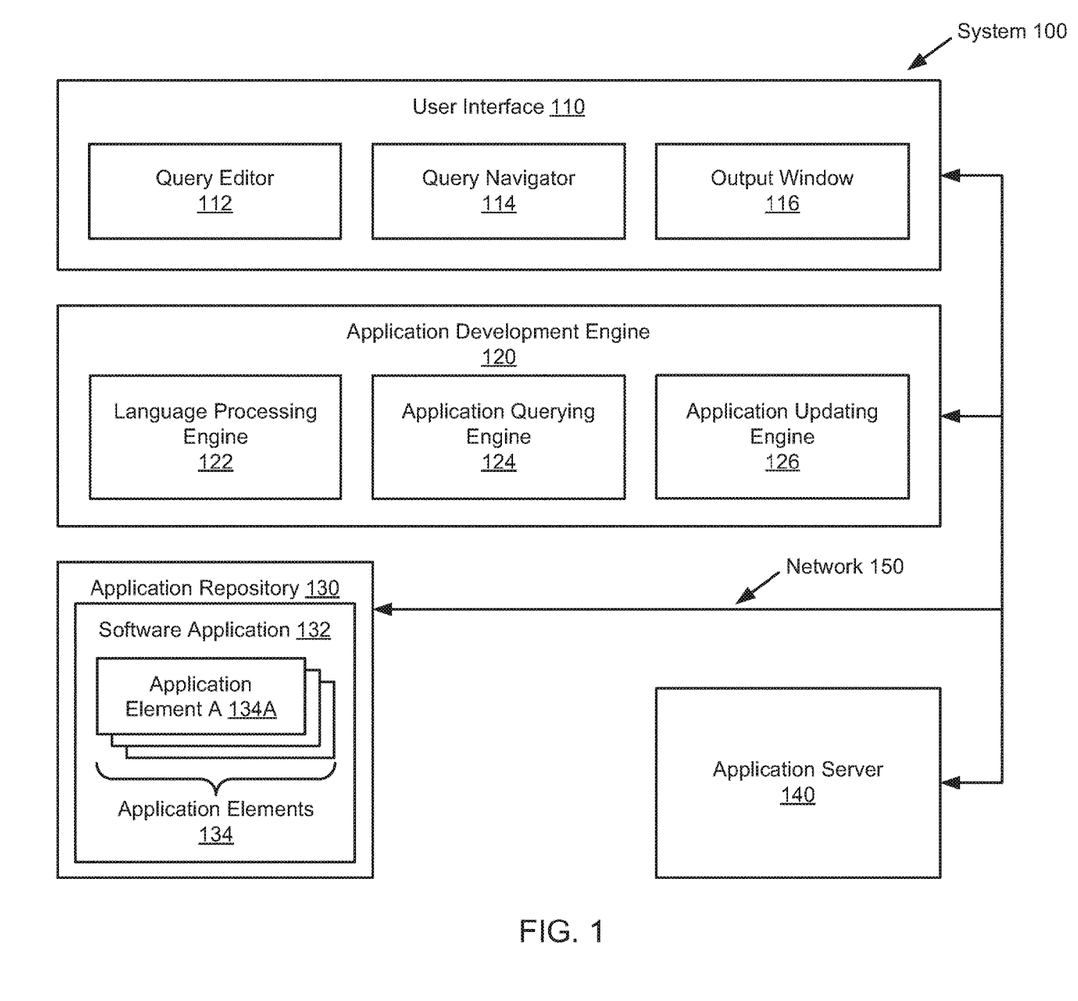
FIG. 1 shows a system in accordance with one or more embodiments of the technology.

FIG. 1 shows a schematic diagram of a system in accordance with one or more embodiments of the technology. Specifically, FIG. 1 shows a schematic diagram of a system (100) enabling an application developer, a business consultant, or any user involved in designing a software application to query the software application for specific application elements. The system may then enable the user to perform maintenance on the identified application elements that match the query, including, for example, updating, revising, replacing or deleting the application elements. As shown in FIG. 1, the system may include a user interface (110), an application development engine (120), an application repository (130) and an application server (140). Each of these components is described in detail below.

As previously noted, the system (100), in accordance with one embodiment of the technology, includes the user interface (110). The user interface may be, for example, a browser-based application executing on a computing device similar to the exemplary computing device shown in FIG. 5. The user interface may be executing on the computing device where the application development engine (120) is located, or it may be hosted on a separate computing device.

The user interface (110) may be an application that interfaces with the application development engine (120), described below. The user interface may serve at least two purposes: (i) The user interface may provide a query, obtained from a user, to the application development engine, and (ii) The user interface may receive results of the query execution from the application development engine, and may provide these results to the user. Additional interaction between the user interface (110) and the application development engine (120) may result from the user inspecting and potentially editing application elements, provided as results of the query execution.

The user interface (110) may enable a user to enter a query, e.g. an English language sentence that specifies criteria based on which application elements are to be identified. For example, the user-provided query "select label from unused Picklists where entryname="Educational" and entryvalue="EDU" may be used to locate, within a software application, all pick lists that are not used, and where additional limitations are required for the fields "entryname" and "entryvalue". The user-provided query may in addition include instructions for manipulating the identified application elements. For example, the user-provided query "find all usage of PIN code and replace with ZIP code" may be executed to first identify all application elements where a PIN code is used, and subsequently to update all identified application elements to use a ZIP code instead of the PIN code. Another query may include update instructions that may update metadata of the identified application elements. Multiple update instructions may be included in a single query. For example, the query phrase "Update pages
  Set widget_css_class = "x_disable_feed_in_animation"
where
  widget_disable_expression not null
  Delete data_service_instances from pages where data_service_instance is not used"
includes two update instructions. The function and the format of queries IS described in detail below.

In one embodiment of the technology, the user interface (110) includes a query editor (112) that may be used to specify queries. The query editor (112) may, for example, accept text entries, e.g., a user may directly type a query. The query editor (112) may provide assistance as the user is entering the query. For example, an autocomplete function may suggest valid entries as the query is entered. Additionally or alternatively, the query editor may include other forms of assistance. For example, menus or lists of valid entries may enable a user to compose, e.g. using drag & drop selection, a valid query. The query editor (112) may also include functionality to validate the query (including, for example, functionality to check the syntax of the query), and to initiate execution of the user-provided query.

In one embodiment of the technology, the user interface further includes a query navigator (114). The query navigator may provide the user with a history of queries, and may enable the loading, saving, deleting and renaming of queries, thus facilitating the repeated use of queries.

In one embodiment of the technology, the user interface (110) allows construction of complex queries from basic queries. For example, a basic query, entered by a user may be combined with other user-entered queries or previously entered queries, retrieved using the query navigator (114).

The user interface (110), in accordance with an embodiment of the technology, further includes an output window (116). The output window may display the results of the execution of the user-provided query, for example, as a list of detected application elements or as a tree showing the identified application elements, including interdependencies with other application elements. The output window may be specific to the criteria specified in the query. For example, if the query required a particular parameter to be in a specified range, the actual parameter value may be displayed in the output window, for each identified application element. In one embodiment of the technology, detected application elements, matching the user-provided query, may be examined in the output window (116) or, for example, in a separate popup window. Details such as properties, interdependencies, usage, detected errors, potential errors, etc. may be displayed. In one embodiment of the technology, the output window provides editing capabilities that enable a user to manipulate a selected application element, for example, by updating parameters of the application element.

Continuing with the discussion of FIG. 1, the system (100) further includes the application development engine (120). The application development engine, in accordance with one or more embodiments of the technology, includes a set of software and/or hardware modules for receiving, from the user interface (110), a query entered by a user and for querying a software application (132), stored in an application repository (130) for application elements that match the user-provided query. The application development engine further may include software and/or hardware modules for notifying the user interface of the matching application elements and for updating application elements, if updated instructions are included in the user-provided query, and/or if the user manually revises selected application elements via the user interface.

The application development engine (120), in accordance with an embodiment of the technology, includes a language processing engine (122). The language processing engine may receive the query, specified by the user via the user interface (110), and may translate the user-provided query into a formalized query that the application querying engine (124) may be able to process. Translation may be necessary because the query, entered by a user via the user interface (110), may be provided in a format not compatible with the application querying engine (124). For example, the user interface (110) may accept queries expressed using English language vocabulary and grammar. Although this may be desirable, for example, to enable users with no or little software application development background to perform software application maintenance, this user-provided query may not be suitable as an input to the application querying engine and may therefore require translation. Further, different implementations of the application querying engine may require different query formats and may thus require query translation. For example, a pattern matching algorithm may require the query to be provided in the form of a pattern of a particular structure, whereas other querying engines may require different representations of the query.

The application development engine (120), in accordance with an embodiment of the technology, further includes an application querying engine (124). The application querying engine may include querying engines for searching application elements (134) of a software application (132) for application elements that match the query specified by the user via the user interface (110). The application query, specified by the user, may be a query of various complexity. The query may be, for example, a basic query as further described below, or a complex query, assembled from basic queries. In one embodiment of the technology, the application querying engine is based on a pattern matching algorithm, e.g., the Rete algorithm. The Rete algorithm may accept the query in the form of graph patterns that are derived from the query specified by the user. For example, EMF-IncQuery® by the Eclipse Foundation may be used if the data model used to represent the application elements (134) of the software application (132) are based on the Eclipse Modeling Framework® (EMF). Alternatively, other graph-based or non-graph-based pattern matching algorithms may be used. For example, the application elements, if they are represented using the Extensible Markup Language (XML), may be parsed using the XML Path Language to identify elements matching the query provided by the user. Those skilled in the art will recognize that any method for identifying matching elements within the application elements of the software application may be employed.

The application development engine (120) may also include an application updating engine (126). The application updating engine (126) may modify application elements identified by the application querying engine, if necessary. For example, application elements may need to be modified if the user-provided query includes instructions for modifying detected application elements. In addition, application elements may also need to be modified if the user, after a review of the application elements identified by the application querying engine, decides to modify one or more of the application elements. The application updating engine, in accordance with an embodiment of the technology, replaces a current application element of the software application in the application repository (130) with a revised application element that includes the modifications performed based on instructions provided with the user-provided query, or as instructed by the user editing particular application elements.

The language processing engine (122), the application querying engine (124) and the application updating engine (126) may be located on the computing device, for example, on a computing device similar to the computing system of FIG. 5. Alternatively, the language processing engine (122), the application querying engine (124) and the application updating engine (126) may be distributed over separate computing devices.

Continuing with the discussion of FIG. 1, the system (100) further includes the application repository (130). The application repository may store the software application (132). The application repository may be any type of non-volatile storage, including, for example, a hard disk drive, a redundant array of independent disks (RAID), network attached storage (NAS), cloud storage, etc. Further, at least some of the content of the data repository may alternatively or in addition be stored in volatile memory, e.g., in RAM.

The software application (132), in accordance with one or more embodiments of the technology, includes the resources that, when loaded and executed, e.g., by the application server (140) or by another computing device, may form an instantiated application (not shown). The software application (132) may include, for example, HyperText Markup Language (HTML), JavaScript and Cascading Style Sheets (CSS) instructions that define appearance and function of the application. In one or more embodiments of the technology, the software application includes application elements (134). An application element, in accordance with one or more embodiments of the technology, is a single unit of code which describes a single object, e.g., a document, an access control list, a user, a user group, or any other type of object that is part of the software application. The data format of the application elements (134) of the software application (132) may be determined by the chosen data model. The data model may be based on, for example, the Eclipse Modeling Framework® (EMF), where application elements (134) may be specified using extensible markup language (XML). For example, XML files may be used to store one or more application elements. The XML file may include content of the application elements and markup for structuring and annotating the content.

Continuing with the discussion of FIG. 1, the system (100), in accordance with one or more embodiments of the technology, includes the application server (140). The application server may instantiate the software application (132) and may provide services, implemented by the software application to users. Alternatively or additionally, the application server may be accessed by remote computing devices (not shown) that may load the application via the application server (140). The software application may be, for example, a web application, that may be executed in a web browser on a remote computing device. The application server may be executing on a computing device similar to the exemplary computing device shown in FIG. 5. The application server (150) may be on-premises, operated by the legal entity (e.g. the company) providing, using and/or administrating the system (100). Alternatively, the application server may be hosted by a third party, e.g., in a datacenter. Further, the application server may be cloud-based, e.g. the application server may provide its services as a software as a service (Saas). Although a single application server (140) is shown in FIG. 1, components of the application server may be distributed over multiple computing devices, either locally or remotely. The application server may be connected to a network (150) (e.g., a local area network (LAN), a wide area network (WAN) such as the Internet, mobile network, or any other type of network) via a network interface connection (not shown), thereby enabling the application server to communicate with the application repository (130) and/or distributed components of the application server.

The components of the system (100), i.e., the user interface (110), the application development engine (120), the application repository (130) and the application server (140) may communicate using any combination of wired and/or wireless communication protocols. In one embodiment of the technology, the user interface, the application development engine, the application repository and the application server communicate via a wide area network (e.g., over the Internet), and/or a local area network (e.g., an enterprise or home network). The communication between the components of the system (100) may include any combination of secured (e.g., encrypted) and non-secured (e.g., un-encrypted) communication. The manner in which the components of the system communicate may vary based on the implementation of the technology.

One skilled in the art will recognize that the architecture of the system is not limited to the components shown in FIG. 1. For example, the system may also include one or more computing devices, e.g., desktop or mobile computing devices that a user may rely on to connect to the system via the application server. Such computing devices may be similar to the exemplary computing device shown in FIG. 5. The computing device may be connected to the network (150), thereby enabling the computing devices to interface with the application server (140). The computing devices may have, executing thereon, web browsers. A web browser may provide a platform for the execution of the software application as a client application, which may be displayed to the user of the computing device as one or more web pages. Further, the user interface (110) and the application development engine (120) may include additional components that enable an application developer to build, revise and administrate the software application.

Figure 2:
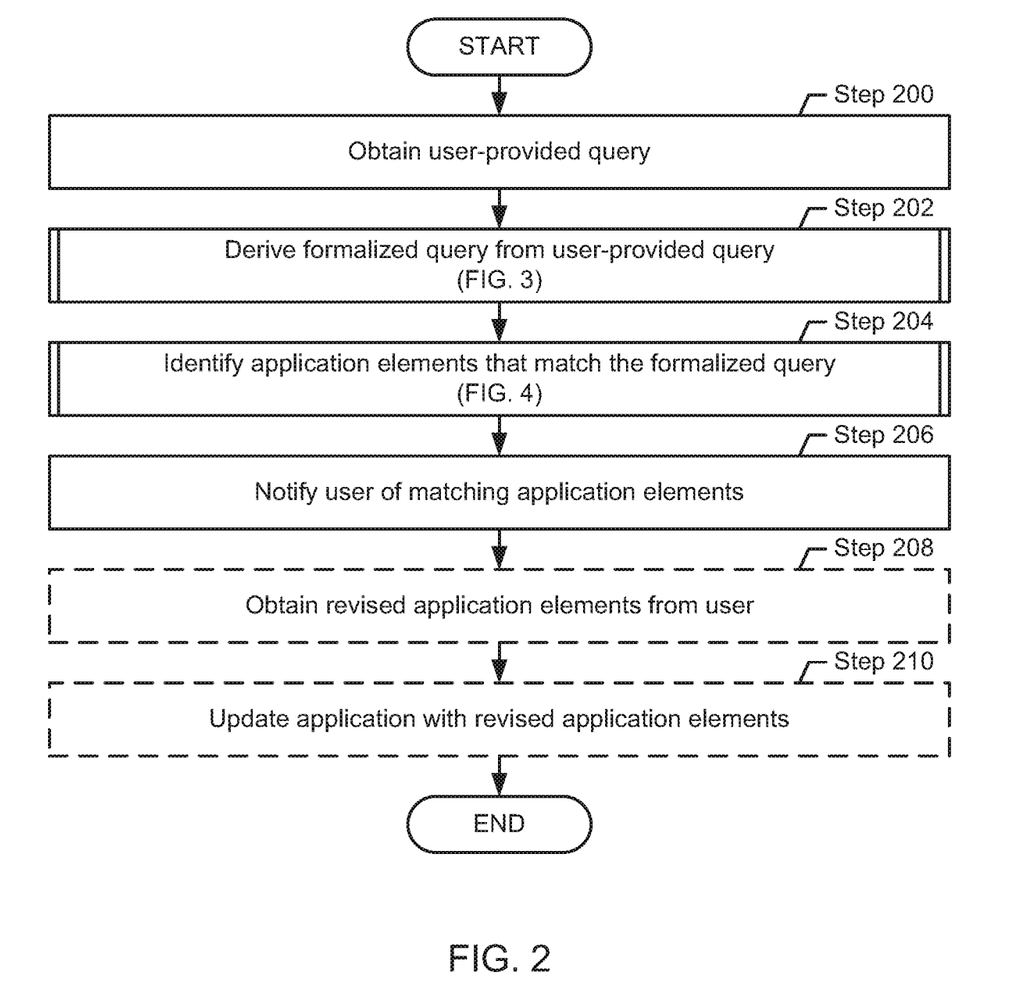
FIGS. 2-4 show flowcharts in accordance with one or more embodiments of the technology.
Figure 3:
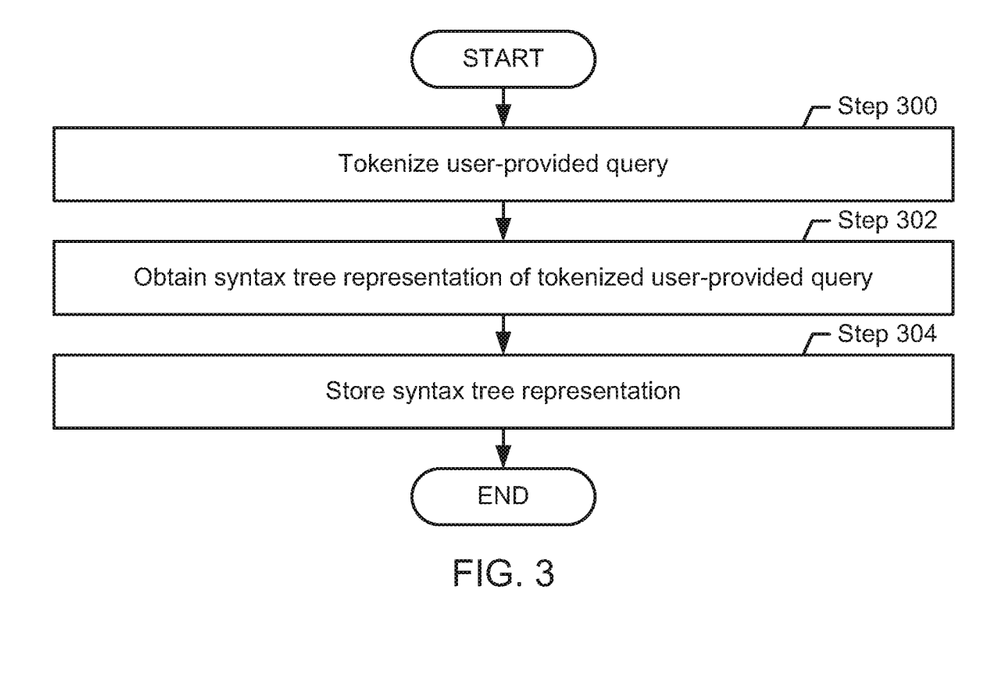
Figure 4:
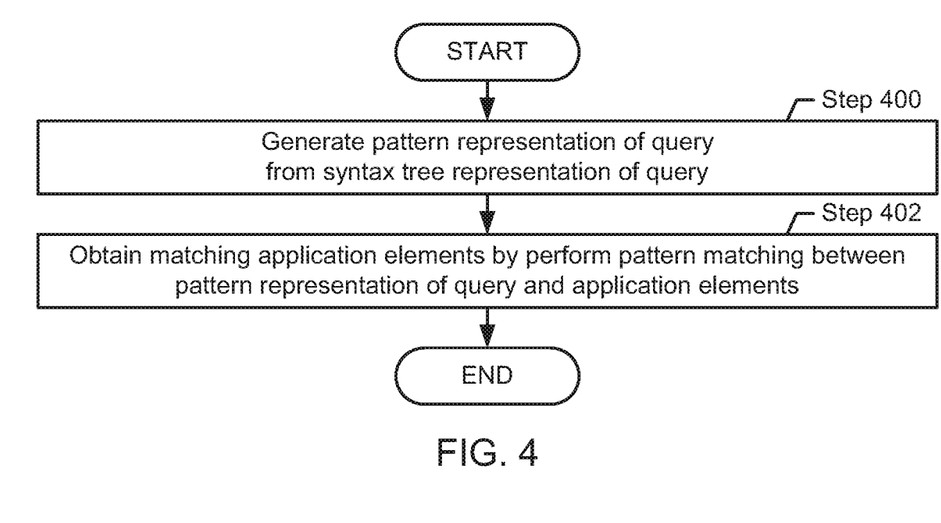

FIGS. 2-4 show methods for software application optimization using natural language-based optimization rules. FIG. 2 describes the overall method, whereas FIGS. 3 and 4 describe details, referred to in FIG. 2.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 2-4 may be performed in parallel with any other steps shown in FIGS. 2-4 without departing from the technology.

FIG. 2 shows a method for software application optimization using natural language-based optimization rules, in accordance with one or more embodiments of the technology. The method may be executed each time a user, e.g., a business consultant, a software application designer or a software application administrator invokes execution of the method.

Turning to FIG. 2, in Step 200, a user-provided query is obtained. The user-provided query, in accordance with an embodiment of the technology, includes constraints, based on which application elements of the software application that meet these constraints, may be identified. The user-provided query may, in addition, include instructions for manipulating the identified application elements, as previously described, with reference to FIG. 1. The user-provided query may further include instructions for defining the output returned to the user, after executing the query. For example, the query may specify that only the names of the identified application elements are returned, or alternatively, that specified properties of the identified application elements are returned. The user-provided query may also include additional elements such as comments that may be used for documentation purposes. These comments may facilitate future use of the query, for example, by a different user. The user-provided query in accordance with one or more embodiments of the technology may be a string, composed using simple to read and write human language, e.g., it may be an English language sentence. The user-provided query may be based on a grammar that includes various elements. The grammar may include nouns. A noun may be used to specify an element on which an action is to be performed. The grammar may include verbs to express actions, including, for example, "update", "count", "replace", "update", "fetch", etc. The grammar may also include "where" clauses to specify Boolean conditions. The grammar may in addition include conjunctive clauses to construct complex conditional statements, and it may also include adjectives such as "unused", "distinct", etc. to express additional constraints. Further, aliasing may be supported, for example, to express a complicated keyword using a simple, meaningful keyword. In one embodiment of the technology, the user-provided query may be expressed using a context-free grammar.

The following is an example of a user-provided query: "select label from Pages." The sample user-provided query "select label from Pages" includes an action ("select") and a feature ("label"). Accordingly, the query instructs the querying engine to select labels from the application elements. The sample user-provided query further includes an additional limiting statement ("from Pages"). Accordingly, labels are selected only from application elements that are pages. The above sample user-provided query will subsequently be referred to repeatedly, to describe the processing and application of user-provided query, in accordance with one or more embodiments of the technology. Those skilled in the art will recognize that this sample user-provided query is intended to merely serve as an example for a user-provided query, and that the technology is not limited to a particular user-provided query.

The user-provided query may be provided by the user entering the query. A user-provided query may be composed for example, by typing the query and/or by picking query elements from a list of query elements for example using a drag & drop paradigm. Assistance may be provided, for example, in the form of autocomplete and/or autosuggest features, as the user is entering the query. In one embodiment of the technology, the assistance enforces vocabulary and grammar requirements that are based on the lexicon and grammar used to interpret the user-provided query, as described below, with reference to FIG. 3. A query may alternatively be selected from previously composed queries that have been stored. The selected previously composed query may either be used directly, or it may be modified prior to its use.

In Step 202, a formalized query is derived from the user-provided query, obtained in Step 200. While the user-provided query may be in a human language-like sentence format, the formalized query may be in a format compatible with the subsequently performed methods for identification of application elements. The details of Step 202 are described in FIG. 3.

In Step 204, application elements that match the formalized query are identified. A pattern matching algorithm or other querying engines suitable for the identification of application elements matching the criteria of the formalized query may be used. The details of Step 204 are described in FIG. 4.

In Step 206, the user is notified of the application elements identified in Step 204. The user may be notified by displaying the detected application elements to the user. The detected application elements may be displayed, for example, formatted as a list that may include details such as names, types and/or labels of the detected application elements. The detected application elements may alternatively be displayed as a tree showing the detected application elements, including interdependencies with other application elements. The list or the tree may be interactive, allowing the user to explore properties of the detected application elements. Editing the displayed application elements may be possible, as described below in Step 208.

In Step 208, revised application elements may optionally be obtained from the user. As discussed in Step 206, the user may inspect the identified application elements.

During the inspection, the user may decide to edit one or more of the application elements. The user may update application elements, e.g., by changing attributes, parameters, labels, etc. within the user interface, while inspecting the application elements. Assistive tools may be available to support the user when editing the application element. These assistive tools may include autocorrect, autocomplete and autosuggest functionalities for optimizing the application elements. Further, context-sensitive application element editing capabilities may be provided. For example, a menu may enable the user to show, delete, copy, edit, rename and/or duplicate an application element.

In Step 210, the application may optionally be updated with revised application elements. In one embodiment of the technology, the user-provided query may include instructions for modifying identified application elements. For example, a query may include instructions for identifying all user profiles of the system, and for updating the location information of all users because the users have been relocated to a different building. Alternatively, edits to identified application elements may also be made by the user, as described in Step 208. In Step 210, the revised application elements may be written to the application repository to replace the current application elements, thus updating the application.

FIG. 3 shows a method for deriving a formalized query from a user-provided query, obtained in Step 200. The method described in FIG. 3 may translate the user-provided query, that may be expressed using common language expressions, e.g. using English language sentences, into a query suitable as an input to the querying engine. The method described in FIG. 3 may be executed each time a user initiates the identification of matching application elements by providing a query.

In Step 300, the user-provide query IS tokenized, i.e., the query is segmented into linguistic units such as words, punctuation, numbers, alpha-numerics, etc. The tokenization may be performed by an algorithm that separates words based on the detection of "space" characters. Alternatively or additionally, the tokenization may include linguistically motivated considerations and may include extensions for handling abbreviations, hyphenation, numerical expressions, field-specific vocabulary, and/or for detecting names. In one embodiment of the technology, the tokenization algorithm is language specific. In addition, the tokenization algorithm may be capable of handling spelling errors and unexpected characters.

In Step 302, a syntax tree representation of the tokenized user-provided query is obtained. The syntax tree, in accordance with an embodiment of the technology, represents the user-provided query in a format suitable as an input to the querying engine, used for identification of application elements matching the query.

In one embodiment of the technology, the tokenized user-provided query is parsed to generate an XML-based representation of the tokenized user-provided query that includes segmented sentence elements such as verb phrases, noun phrases, or other sentence elements including individual words. The parsing may be performed using a grammar and/or a lexicon suitable for the interpretation of the tokenized user-provided query. The grammar and/or lexicon may be stored, for example, in one or more XML files and may be accessed as necessary during the parsing of the tokenized user-provided query. In one or more embodiments of the technology, the grammar and the lexicon define the structure and vocabulary a user may use when formulating the user-provided query. Accordingly, different styles of user-provided queries may be supported by exchanging grammar and/or lexicon files.

The generated XML-based representation may have the form of a syntax tree, where the nodes of the tree represent elements of the tokenized user-provided query.

Chaperon, a software project that converts structured text to XML, available under an Apache-style software license, may be used, for example, to perform above-described conversion of the tokenized user-provided query into an XML-format syntax tree. Those skilled in the art will recognize that the technology is not limited to the use of Chaperon. Any technology capable of generating a structured representation of the tokenized user-provided query may alternatively or additionally be used, without departing from the technology.

Those skilled in the art will appreciate that a formalized query may be represented using various syntactic constructs. Other syntactic constructs, such as, for example, labeled bracketing of query elements, may be used as an alternative to a syntax tree.

Figure 5A:
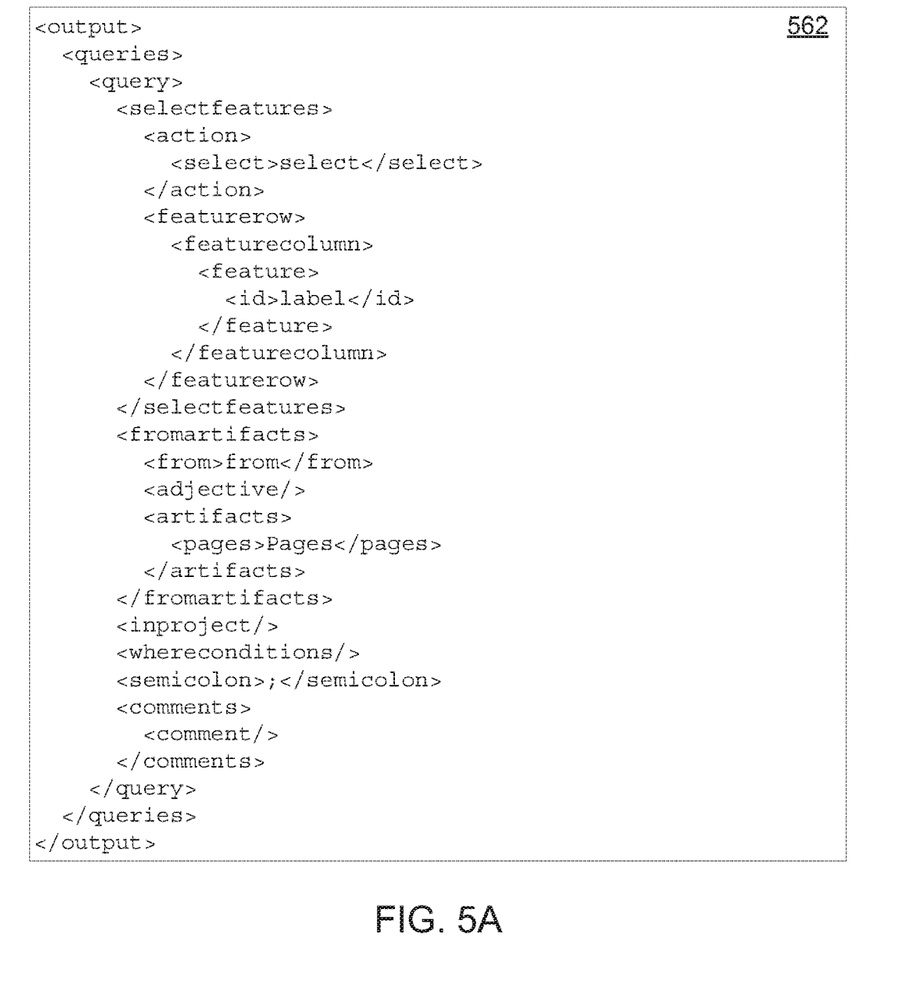
FIGS. 5A and 5B show sample queries in accordance with one or more embodiments of the technology.

FIG. SA shows an exemplary XML-based representation of a sample query, in accordance with one or more embodiments of the technology. The XML-based representation (562) of the sample query is based on the previously introduced user-provided query "select label from Pages". The XML-based representation includes the action ("select"), the feature ("label"), and further specifies that only application elements (artifacts) of the type "Pages" are to be analyzed. The exemplary XML-based representation (562) uses XML tags to express the query. Additional XML tags, included in the XML-based representation, may be used to accommodate more complex user-provided queries and/or other elements. For example, the exemplary XML-based representation (562) includes tags to be used to accommodate comments.

In Step 304, the syntax tree representation of the tokenized user-provided query is stored. The syntax tree (or an alternative syntactic representations of the tokenized user-provided query) may be stored in XML format, in volatile and/or non-volatile memory, e.g., in random access memory (RAM) or on a hard disk. The stored syntax tree, in accordance with one or more embodiments of the technology, provides a formalized version of the user-provided query, thus establishing a translating interface between the user-provided query, specified using human language-like sentences, and the querying engine, requiring a specific query format, different from the format of the user-provided query. The syntax tree may provide this translating interface, regardless of the format of the user provided query and regardless of the requirements of the subsequently executed querying engine. Different formats of the user-provided query may be accommodated using grammar and lexicon extensions suitable for the interpretation of the chosen format, and specific querying engine format requirements may be satisfied by a parser capable of interpreting the syntax tree, as further described below, with reference to FIG. 4.

FIG. 4 shows a method for identifying application elements that match the formalized query, obtained in Step 202, as described above, with reference to FIG. 3. The method described in FIG. 4 may be executed each time a user initiates the identification of matching application elements by providing a query.

In Step 400, a pattern representation of the query is generated from the syntax tree representation of the query. The pattern representation may be specific to the querying engine being used in Step 402, and may be obtained as follows. First, the syntax tree may be parsed to extract the constraints to be included in the pattern representation of the query. If the syntax tree is stored in XML format, XPath expressions may be used to select nodes from the XML file to retrieve query elements, words, phrases or statements. The results of the parsing may include multiple basic query elements, phrases and/or statements. A few examples for the elements returned are actions (such as "select", "update", etc.) and adjectives (such as "unused", "repeated", "connected", etc.). These elements may later determine the final pattern of query that may be generated in accordance with one or more embodiments of the technology.

Next, the patterns, required as inputs to the querying engine, are derived from the basic query statements extracted from the syntax tree. In one embodiment of the technology, the basic query statements are processed as follows, to generate the patterns. First, basic query statements for actions (i.e. verbs) may be processed. The verb(s) (e.g., "select", "count", "update", etc.) may be identified to select the corresponding elements for the pattern. Next, basic query statements for adjectives may be processed. The adjective(s) (e.g., "unused", "repeated", "connected", etc.) may be identified to select the corresponding elements for the pattern. Subsequently, constraints may be implemented based on these adjectives. For example, the verb "select" may be constrained by the adjective "unused" if only unused objects are to be selected, based on the user-provided query. The resulting pattern may be used as an input to the querying engine.

The above-described examples for verbs and adjectives are intended to only serve illustrative purposes. The technology is not limited to these examples. Additional verbs, adjectives and/or other grammatical constructs may be available, and/or may be added at a later time. Any verb or adjective may be made available if the corresponding elements to be included in the pattern are available.

If, as previously discussed, EMF-IncQuery® is used for querying, an IncQuery pattern may be generated. The IncQuery pattern may be generated by selecting Eclipse extensions based on the basic query statement extracted from the syntax tree. For example, there may be an extension point for actions. Depending on a verb included in the basic query statement, the extension appropriate for representing the action may be selected by connecting the extension to the extension point. The extension, connected to the extension point, may provide the elements of the IncQuery that represent the action, when executed. For example, the extension may generate constraints, specify headers, specify data to be imported, etc., that may be specific to the basic query statements, and that are to be included in the IncQuery pattern. If no appropriate extension is found, an exception may be thrown. Adjectives and other grammatical constructs may be handled in a similar manner. The IncQuery may be formed from the combination of IncQuery elements provided by the selected extensions. The IncQuery pattern, in accordance with an embodiment of the technology may be provided to the IncQuery application querying engine, along with the application elements, thus enabling the IncQuery engine to identify application elements that match the IncQuery pattern. Those skilled in the art will recognize that the patterns or queries derived in Step 400 depend on the input format expected by the querying engine used in Step 402. Accordingly, the details of Step 400 may vary in a querying engine-specific manner without departing from the technology.

Figure 5B:
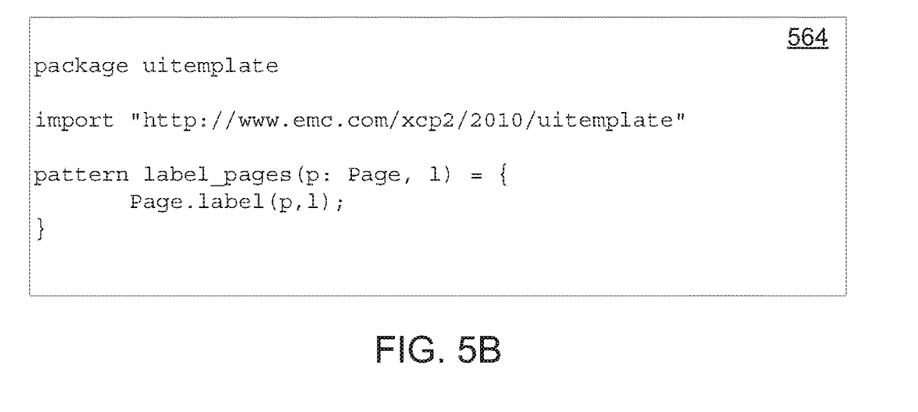

FIG. 5B shows an exemplary IncQuery, in accordance with one or more embodiments of the technology. The IncQuery (564) is based on the previously introduced user-provided query "select label from Pages", and was derived from the previously presented exemplary XML-based representation (562), shown in FIG. 5A. The IncQuery (564) includes the query in IncQuery format, and further specifies data to be imported, e.g., data that include the application elements on which the query is to be applied.

In Step 402, matching application elements are obtained by performing pattern matching between the pattern generated in Step 400 and the application elements. In one embodiment of the technology, the IncQuery application querying engine that is based on the Rete pattern matching algorithm is used to identify matching application elements. Alternatively, other string searching algorithms such as Boyer-Moore, Knuth-Morris-Prath, Rabin-Karp, or even manual comparisons may be used to identify application elements that match the pattern obtained in Step 400.

Embodiments of the technology may enable a system to identify application elements matching a user-specified query, regardless of the complexity of the data model used for storing the application elements. The application elements may then be modified as specified in the query, or alternatively, they may be manually updated by the user. Many application elements may be edited and updated at once in batch update, thus eliminating tedious and error-prone identification and manual editing of individual application elements.

The query, in accordance with one or more embodiments of the technology, may be specified using, for example, simple English language-like expressions. Further, assistive functionalities such as autocomplete and/or autosuggest functions may further simplify the formulation of a query. Accordingly, non-expert users without a software development background may be able to phrase meaningful queries to accomplish a desired goal.

The system, in accordance with one or more embodiments of the technology, may thus enable a convenient, effective and intuitive search for application elements, thus eliminating the need for time-consuming and error-prone manual searches for these application elements. Queries, once established, in accordance with an embodiment of the technology, may further be archived and may be reused at a later time, as necessary. A new query may further be derived from an existing query by modifying the existing query.

In particular in large, complex software applications, where many application elements may require attention, the use of the methods and the system in accordance with one or more embodiments of the technology, may result in significant time savings. The quality of software application maintenance may improve due to a reduced likeliness that application elements are erroneously omitted.

Figure 6:
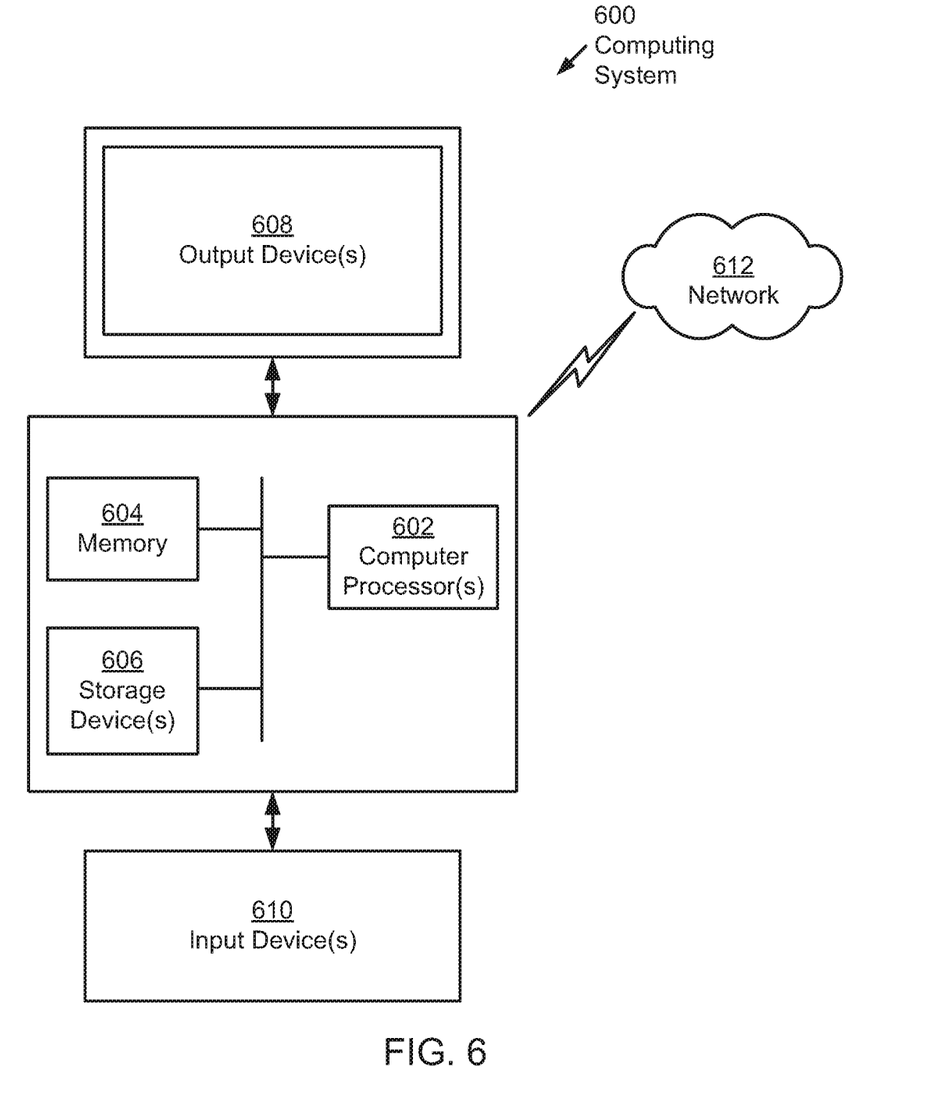
FIG. 6 shows a computing system m accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method comprising:
   obtaining, by an application development engine executing on a computing device, a user-provided query input via a user interface, the user-provided query relating to an optimization constraint and an optimization action;
   deriving, by the application development engine, a formalized query from the user-provided query by translating the user-provided query into a syntactic construct of segmented sentence elements;
   obtaining, by the application development engine, an application element that matches the optimization action from an application repository, comprising:
      deriving a pattern representation of the user-provided query from the formalized query; and
      identifying a first application element that matches the pattern representation of the user-provided query from a plurality of application elements, including identifying the first application element as a candidate for the optimization action; and
   performing, by the application development engine, the optimization action, including revising the identified application element.

2. The method of claim 1, wherein each of the plurality of application elements is a single unit of code that forms an object.

3. The method of claim 1, wherein the optimization constraint comprises a verb that specifies an action.

4. The method of claim 3, wherein the optimization constraint comprises an adjective that constrains the verb.

5. The method of claim 1, wherein a format of the user-provided query is based on a context free grammar.

6. The method of claim 1, wherein the syntactic construct is a syntax tree.

7. The method of claim 1, wherein a Rete pattern matching algorithm is used to identify the application element that matches the pattern representation of the user-provided query.

8. The method of claim 1 further comprising:
   identifying a second application element that matches the pattern representation of the user-provided query; and
   reporting the second application element to a user.

9. The method of claim 8 further comprising:
   after reporting the identified second application element to the user:
      obtaining a revised application element from the user; and
      replacing the identified second application element with the revised application element.

10. The method of claim 1, further comprising:
    wherein the optimization action comprises instructions for revising the identified application element;
    wherein a revised application element is obtained by revising the identified application element, based on the instructions; and
    replacing the identified application element with the revised application element.

11. A system comprising:
    a computer processor; and
    a non-transitory computer readable medium (CRM) storing code executable by the computer processor to:
       obtain, by an application development engine executing on a computing device, a user-provided query input via a user interface, the user-provided query relating to an optimization constraint and an optimization action;
       derive a formalized query from the user-provided query by translating the user-provided query into a syntactic construct of segmented sentence elements;
       obtain, by the application development engine, an application element that matches the optimization action, comprising:
          deriving a pattern representation of the user-provided query from the formalized query; and
          identifying a first application element that matches the pattern representation of the user-provided query from a plurality of application elements, including identifying the first application element as a candidate for the optimization action; and
       performing, by the application development engine, the optimization action, including revising the identified application element.

12. The system of claim 11, wherein each of the plurality of application elements is a single unit of code that forms an object.

13. The system of claim 11, wherein the code is executable by the computer processor to report the identified first application element to a user.

14. The system of claim 13, wherein the code is executable by the computer processor to, after reporting the identified first application element to the user obtain the revised application element from the user.

15. The system of claim 11, further comprising:
    wherein the optimization action comprises instructions for revising the identified application element;

wherein the code is executable by the computer processor to:
  generate a revised application element by revising the identified application element, based on the instructions; and
  replacing the identified application element with the revised application element.

16. A non-transitory computer readable medium (CRM) storing code, the code comprising functionality for:
  obtaining a user-provided query input via a user interface, the user-provided query relating to an optimization constraint and an optimization action;
  deriving a formalized query from the user-provided query by translating the user-provided query into a syntactic construct of segmented sentence elements;
  obtaining an application element that matches the optimization action from an application repository, comprising:
    deriving a pattern representation of the user-provided query from the formalized query; and
    identifying the application element that matches the pattern representation of the user-provided query from a plurality of application elements, including identifying the application element as a candidate for the optimization action; and
  performing, by the application development engine, a revision on the identified application element.

17. The non-transitory CRM of claim 16, wherein each of the plurality of application elements is a single unit of code that forms an object.

18. The non-transitory CRM of claim 16, wherein the code further comprises functionality for reporting the identified first application element to a user.

19. The non-transitory CRM of claim 18, wherein the code further comprises functionality for, after reporting the identified first application element to the user, obtaining the revised application element from the user.

20. The non-transitory CRM of claim 16, further comprising:
  wherein the optimization action comprises instructions for revising the identified application element; and
  wherein the code further comprises functionality for:
    obtaining a revised application element by revising the identified application element, based on the instructions far revising the identified application element; and
    replacing the identified application element with the revised application element.

* * * * *